US006847656B1

(12) United States Patent
Wu et al.

(10) Patent No.: US 6,847,656 B1
(45) Date of Patent: Jan. 25, 2005

(54) STATISTICAL REMULTIPLEXING WITH BANDWIDTH ALLOCATION AMONG DIFFERENT TRANSCODING CHANNELS

(75) Inventors: Siu-Wai Wu, San Diego, CA (US); Robert S. Nemiroff, Carlsbad, CA (US); Vincent Liu, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 738 days.

(21) Appl. No.: 09/669,517

(22) Filed: Sep. 25, 2000

(51) Int. Cl.[7] ................................................. H04B 1/66
(52) U.S. Cl. .................................. 370/477; 375/240.12
(58) Field of Search .............................. 370/342, 392, 370/394, 395.1, 395.62, 412, 419, 442, 468, 473–474, 486, 503, 536, 428, 429, 477; 375/240, 371

(56) References Cited

U.S. PATENT DOCUMENTS 5,477,397 A    12/1995 Naimpally et al.
5,566,208 A  * 10/1996 Balakrishnan .............. 375/240

(List continued on next page.)

FOREIGN PATENT DOCUMENTS

| EP | 0 627 854 | 12/1994 |
| EP | 0 851 656 | 7/1998 |
| EP | EP 0 915 623 | 5/1999 |
| WO | WO 97/39584 | 10/1997 |
| WO | WO 00/21302 | 4/2000 |
| WO | WO 00/41398 | 7/2000 |
| WO | WO 00/48090 | 8/2000 |

OTHER PUBLICATIONS

Björk, Niklas et al., "Transcoder Architectures for Video Coding," IEEE Transactions on Consumer Electronics, vol. 44, No. 1, Feb. 1998, pp. 88–98.
Staff of Cable Television Laboratories Inc., "Digital TV Solutions," From the Labs: Cable World, Feb. 1, 1999.
Boyce, J.M., "Data Selection Strategies for Digital VCR Long Play Mode," *Digest of Technical Papers for the International Conference on Consumer Electronics*, New York, Jun. 21, 1994, pp. 32–33.

(List continued on next page.)

*Primary Examiner*—Hassan Kizou
*Assistant Examiner*—Gregory B Sefcheck
(74) *Attorney, Agent, or Firm*—Barry R. Lipsitz; Douglas M. McAllister

(57) ABSTRACT

An efficient statistical remultiplexer for processing a number of channels that include video data. In one aspect, transcoding of the video data is delayed while statistical information is obtained from the data. Bit rate need parameters for the data are determined based on the statistical information, and the video data is transcoded based on the respective bit rate need parameters following the delay. In another aspect, a transcoding bit rate for video frames is updated a plurality of times at successive intervals to allow a closer monitoring of the bit rate. Minimum and maximum bounds for the transcoding bit rate, e.g., for buffer overflow and underflow protection, are also updated in each interval. In another aspect, the pre-transcoding quantization scales of the macroblocks in a frame are scaled to provide corresponding new quantization scales for transcoding based on a ratio of a pre-transcoding amount of data in the frame and a target, post-transcoding amount of data for the frame. The quantization scales are adjusted for different portions of the frame as transcoding progresses to ensure that a minimum amount of transcoding bandwidth is allocated to each macroblock.

13 Claims, 6 Drawing Sheets

U.S. PATENT DOCUMENTS

| | | |
|---|---|---|
| 5,617,142 A | 4/1997 | Hamilton |
| 5,619,733 A | 4/1997 | Noe et al. |
| 5,623,312 A | 4/1997 | Yan et al. |
| 5,650,860 A | 7/1997 | Uz |
| 5,686,963 A | 11/1997 | Uz et al. |
| 5,694,170 A | 12/1997 | Tiwari et al. |
| 5,701,160 A | 12/1997 | Kimura et al. |
| 5,719,986 A | 2/1998 | Kato et al. |
| 5,805,220 A | 9/1998 | Keesman et al. |
| 5,923,814 A | 7/1999 | Boyce |
| 5,933,500 A | 8/1999 | Blatter et al. |
| 5,949,490 A | 9/1999 | Borgwardt et al. |
| 6,052,384 A * | 4/2000 | Huang et al. ............... 370/468 |
| 6,167,084 A | 12/2000 | Wang et al. |
| 6,275,507 B1 * | 8/2001 | Anderson et al. ........... 370/487 |
| 6,351,474 B1 * | 2/2002 | Robinett et al. ............ 370/486 |
| 6,483,543 B1 * | 11/2002 | Zhang et al. ............ 348/390.1 |
| 6,570,888 B1 * | 5/2003 | Huang et al. ............... 370/468 |
| 6,643,327 B1 * | 11/2003 | Wang .................... 375/240.12 |

OTHER PUBLICATIONS

G. Keesman, et al., "Transcoding of MPEG bitstreams," Signal Processing: IMAGE Communication, vol. 8, pp. 481–500, 1996.

Gebeloff, Rob., "The Missing Link," http://www.talks.com/interactive/misslink-x.html.

G. Keesman, et al., "Bit-rate control for MPEG encoders," Signal Processing: IMAGE Communication, vol. 6, pp. 545–560, 1995.

D. Bagni, et al., "Efficient Intra-frame Encoding and improved Rate Control in H.263 compatible format," NTG FACHBERICHTE, pp. 767–774 XP002095679 ISSN: 0341–0196, Sep. 10, 1997.

* cited by examiner

STATISTICAL REMULTIPLEXING WITH BANDWIDTH ALLOCATION AMONG DIFFERENT TRANSCODING CHANNELS

BACKGROUND OF THE INVENTION

The present invention relates to a statistical remultiplexer for transcoding digital video signals.

Commonly, it is necessary to adjust a bit rate of digital video programs that are provided, e.g., to subscriber terminals in a cable television network or the like. For example, a first group of signals may be received at a headend via a satellite transmission.

The headend operator may desire to forward selected programs to the subscribers while adding programs (e.g., commercials or other content) from a local source, such as storage media or a local live feed.

Additionally, it is often necessary to provide the programs within an overall available channel bandwidth.

Accordingly, the statistical remultiplexer (stat remux), or multi-channel transcoder, which handles pre-compressed video bit streams by re-compressing them at a specified bit rate, has been developed.

In such systems, a number of channels of data are processed by processors arranged in parallel. Each processor typically can accommodate multiple channels of data. Although, in some cases, such as for HDTV, which require many computations, portions of data from a single channel may be allocated among multiple processors. Moreover, typically a fixed transcoding bandwidth is allocated to one or more groups of channels (stat remux groups).

However, there is a need for an improved stat remux system that provides a bit rate need parameter for each channel to enable bits to be allocated for transcoding the channels in a manner that optimizes the image quality of the coded data, while still meeting the constraints of a limited throughput.

The system should estimate the bit rate need parameter from statistical information that is derived from the bitstream, such as a frame bit count and average quantizer scale values of the original bitstream. The system should be compatible with MPEG-2 bitstreams. The system should allocate a target output frame bit count for I, P and B frames based on the coding complexity estimated from the statistical information of the original bit stream.

Moreover, the system should accommodate MPEG-2 macroblock processing within a frame, by using a macroblock bit count and quantizer scale values of the original bit stream to guide the rate control process to meet the target frame bit count at the output.

The system should provide periodic adjustments of an allocated transcoding bit rate a number of times in a video frame.

Additionally, the system should derive quantizer scale values for transcoding macroblocks in a frame based on original, pre-transcoding quantizer scale values. The quantizer scale values should be adjusted as transcoding of a frame proceeds to ensure that each macroblock is allocated a minimum number of bits for transcoding.

The present invention provides a system having the above and other advantages.

SUMMARY OF THE INVENTION

The present invention relates to a statistical remultiplexer for transcoding digital video signals.

In one aspect of the invention, a bit rate need parameter is estimated for statistical re-multiplexing from a frame bit count and average macroblock quantizer scale values (averaged over a frame) of an original bitstream, such as an MPEG-2 bitstream. A lookahead of, e.g., five-frames is provided.

The invention allocates a total available bandwidth among the transcoding channels.

The invention allocates a target of output frame bit count for I, P and B frames based on the coding complexity estimated from the frame bit count and the average macroblock quantizer scale (averaged over each input frame) of the original bit stream.

Furthermore, in another aspect of the invention, during MPEG-2 macroblock processing within a frame, a macroblock bit count and quantizer scale value of the original bit stream are used to guide the rate control process to meet the target frame bit count at the output.

Thus, the present invention provides an efficient statistical remultiplexer for processing data in a number of channels that include video data. In one aspect of the invention, transcoding of the video data is delayed while statistical information is obtained from the data. Bit rate need parameters for the data are determined based on the statistical information, and the video data is transcoded based on the respective bit rate need parameters following the delay.

In another aspect of the invention, a transcoding bit rate for video frames at the stat remux is updated a plurality of times at successive intervals to allow a closer monitoring of the bit rate. Moreover, minimum and maximum bounds for the transcoding bit rate are updated in each interval. Thus, a portion of a frame is transcoded in a first interval, then the transcoding bit rate is updated, then a second portion of the frame is transcoded in a second interval, then the transcoding bit rate is updated again, and so forth.

In yet another aspect of the invention, the pre-transcoding quantization scales of the macroblocks in a frame are scaled to provide corresponding new quantization scales for transcoding based on a ratio of a pre-transcoding amount of data in the frame and a target, post-transcoding amount of data for the frame.

Moreover, the quantization scales are adjusted for different portions of the frame as the portions are transcoded to ensure that a minimum amount of transcoding bandwidth is allocated to each macroblock.

Corresponding methods and apparatuses are presented.

DETAILED DESCRIPTION OF THE INVENTION

The present invention relates to a statistical remultiplexer for transcoding digital video signals.

Figure 1:
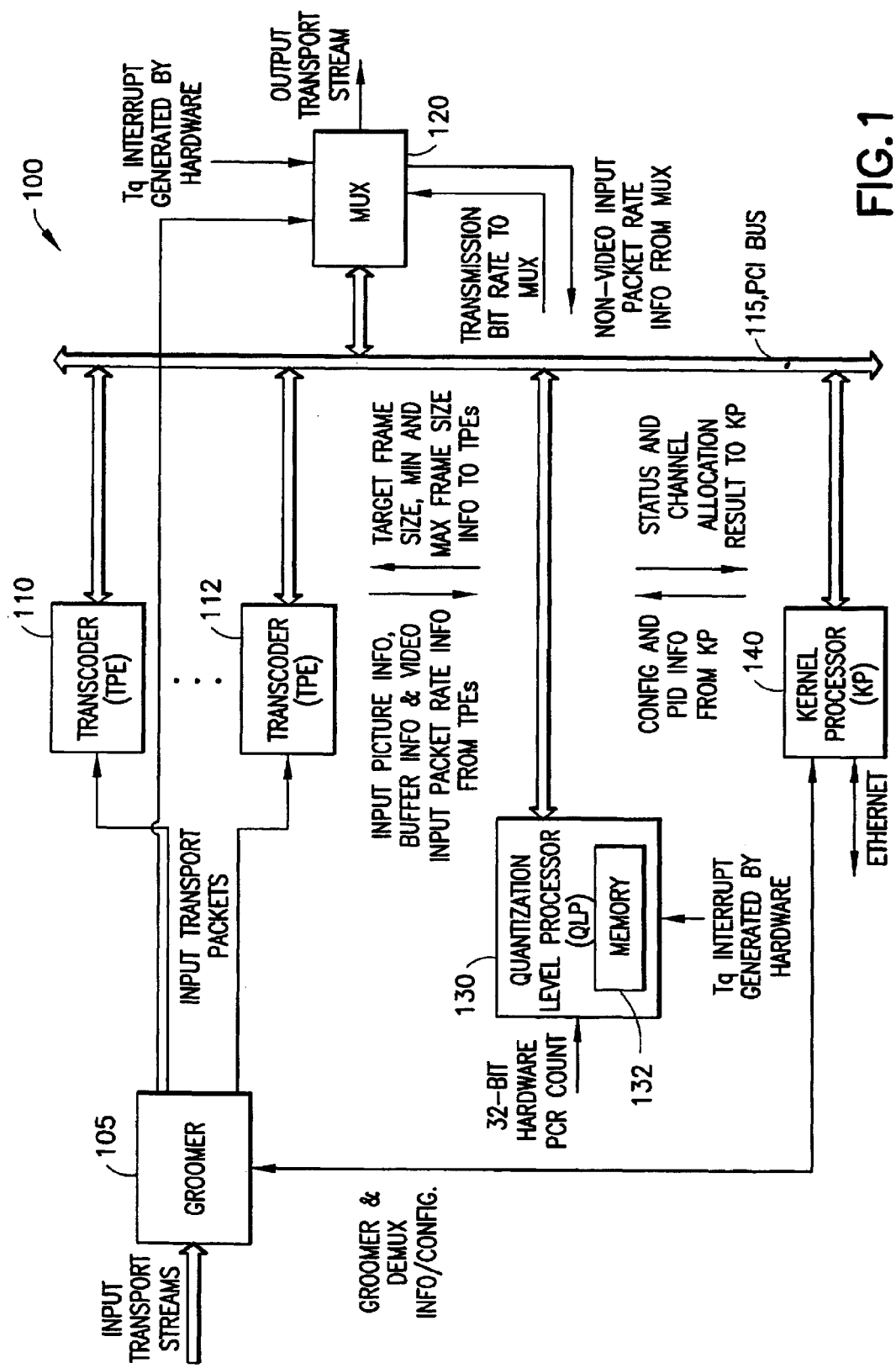
FIG. 1 illustrates a stat remux, and a data flow into and out of a quantization level processor (QLP), in accordance with the present invention.

The following acronyms and terms are used:

BW-Bandwidth
DCT-Discrete Cosine Transform
DTS-Decoding Time Stamp
ES-Elementary Stream
FIFO-First-In, First-Out
KP-Kernel Processor
MTS-MPEG Transport Stream
PCI-Peripheral Component Interconnect
PCR-Program Clock Reference
PES-Packetized Elementary Stream
PID-Program Identifier
Q-Quantization
QLP-Quantization Level Processor
SDRAM-Static Dynamic Random Access Memory
TP-Transport Packet
TPE-Transcoder core Processing Element
VLD-Variable-Length Decoding
VLE-Variable-Length Encoding FIG. 1 illustrates a stat remux, and a data flow into and out of a QLP, in accordance with the present invention.

The stat remux 100 includes a groomer 105 for receiving a number of input transport streams.

Corresponding input transport packets in different video services are provided to one of a number of transcoders 110, . . . , 112, or TPEs (transcoding engines).

Typically, each transcoder can handle one or more video services (channels). Transcoded data is provided via a PCI bus 115 to a multiplexer (mux) 120, which assembles a corresponding output transport stream.

A Kernel Processor (KP) configures the groomer 105, the TPEs 110, . . . , 112, the QLP 130, and the Mux 120.

In particular, the mux 120 is responsive to a transmission bit rate provided from a QLP 130, which has a memory 132 such as a SDRAM. The QLP may be implemented using a media processor, such as the MAPCA2000 (300 MHz) media processor from Equator Technologies, Inc. The QLP 130 performs the following functions:

Allocates an available bandwidth to the output video services to optimize the video quality and determine the target frame size for each frame to be transcoded.

Receives configuration parameters from the Kernel Processor.

Reports operational status and statistics back to the Kernel Processor.

The QLP communicates with the KP and TPEs via the PCI bus (32 bit @ 66 MHz). A block of memory is allocated on an SDRAM of the QLP for interprocessor communication. This memory block is "shared" by the QLP with other processors.

Inputs to QLP 130

Configuration parameters and commands (Source: KP 140)

Video and associated audio and data input packet rate information (Source: TPEs 110, . . . , 112)

Statistics of the input frame to be transcoded (Source: TPEs)

Timing information of the input frame (Source: TPEs)

Statistics of the output frame just transcoded (Source: TPEs)

Timing information of the output frame (Source: TPEs)

Transcoder FIFO level (Source TPEs)

Non-video (data) input packet rate information (Source: Mux 120)

Outputs from QLP 130

Status and statistics (Destination: KP)

TPE service assignment information (Destination: KP)

Transmission bit rate (Destination: Mux)

Transcoding target frame size (Destination: TPE)

Maximum and Minimum frame size for buffer protection (Destination: TPE)

Minimum number of PCRs to be inserted into a frame (Destination: TPE)

Flag to command the TPE to passthrough a frame (Destination: TPE)

1. Overview

Although the transcoder 100 is not necessarily decoding and re-encoding the video stream, the transcoding function can emulate a full decode and re-encode.

The rate control and stat-remux system in accordance with the invention is summarized in the following steps. Details are described in the next sections.

1. Each TPE 110, . . . , 112 inputs the transport stream of every video channel it is processing. The transport stream is then unpacketized and a video decoder buffer is emulated. A lookahead buffer is used by each TPE to store a number of future frames and obtain statistical information from these frames. In particular, for every input frame to be transcoded, the TPE computes the average quantizer scales values and the number of bits in the input frame. These parameters are used by the QLP 130 to calculate the bit rate need parameter for the input frame at a scheduled time that is at least 1.5 NTSC frame times before it is that frame's turn to be transcoded. In particular, because of the possible use of the 3:2 pulldown format in the video channels, a coded frame can be either one NTSC frame time (33.3 ms) or 1.5 frame times (50 ms). We use the longer time to make sure the transcoding rate allocation for the frame is determined before the actual transcoding begins.

2. The QLP 130 performs a bandwidth allocation process to allocate a transcoding bit rate to the TPEs at periodic intervals, $T_q$. It computes the transcoding bit rate for every video channel for each Tq interval.

The transcoding bit rate is stored in a queue at the QLP 130 and delayed for (0.5 sec+3 NTSC frame periods)=0.6 sec., rounded to the nearest Tq period.

One NTSC frame period is $\frac{1}{30}$ sec. The delayed value of the transcoding bit rate of the video channel becomes the transmission bit rate, and is used by the Mux 120.

3. While a frame is in the lookahead buffer of a TPE, the average transcoding bit rate over the frame is used to derive an initial value of a target frame size, which is a predicted size of the frame after transcoding. This initial target frame size value is stored in an output frame size queue (e.g., in memory 132) of the QLP 130, and is retrieved when the associated TPE is ready to transcode the frame. Queues may be implemented by the QLP in the memory 132.

4. When the transcoder is ready to transcode a new frame, the initial target frame size value that was previously determined is retrieved from the output frame size queue. Based on the current state (fullness) of the transcoder buffer, the maximum and minimum frame size to protect the decoder buffer from underflow or overflow are calculated for bounding the initial target frame size.

5. If the number of target bits (target frame size) is greater than (or close to, within a predetermined tolerance-see section 6.3) the number of bits in the input frame, this frame bypasses transcoding in a passthrough mode since the purpose of transcoding is to reduce the number of bits in a frame.

This situation may occur when the input bitstream is already heavily compressed. When a frame is bypassed, 111 the associated input elementary stream is re-packetized.

If the number of target bits is smaller than the number of bits in the input frame, the frame is bit-reduced (transcoded). Bit reduction may be performed, e.g., either through a simplified transcoder architecture (FIG. 2) or re-quantization (FIG. 3).

6. The quantizer scale for each macroblock (or group of macroblocks) for transcoding is chosen based on the number of target bits per frame, and the original quantizer scale. The condition that the output quantization scale is higher (coarser) than the input quantization scale must be met.

7. During transcoding, the TPEs have to allocate certain slots for a PCR field in the packets they output. It is important to avoid allocating more slots than necessary since this wastes bits. Thus, the outgoing packets at a TPE are created and stored in memory, e.g., in a TPE FIFO buffer. Moreover, the QLP 130 uses the target frame size to estimate the time used for transmitting the frame, and hence the time for inserting the PCRs.

Moreover, a PCR slot is created at least every 0.1 second to conform to the MPEG2 system standard requirement.

8. At each n*Tq period, the Mux 120 reads the number of packets assigned to each channel from the TPEs 110, . . . , 112 via the PCI bus 115. "n" is a design parameter for the Mux 120 and can be any positive integer. This packet assignment is equivalent to the transmission bit rate allocation, which is in turn a delayed version of the transcoding bit rate allocation.

That is, the bit rate is converted to a number of packets to send to the Mux per Tq period.

9. The Mux 120 receives a transport tick every m ticks of a 27 MHz clock. If the packet to transmit contains a PCR, the Mux performs PCR correction to provide a PCR value that is properly synchronized with a master clock of the transcoder. This may be achieved as described in commonly-assigned, co-pending U.S. Pat. No. 6,724,825, issued April 20$^{th}$, 2004, to R. Nemiroff, V. Liu and S. Wu entitled "Regeneration Of Program Clock Reference Data For Mpeg Transport Streams." The transport packet(s) are sent out the Mux Processor via the PCI bus 115. The transport tick refers to the timing interval for outputting a transport packet.

Figure 2:
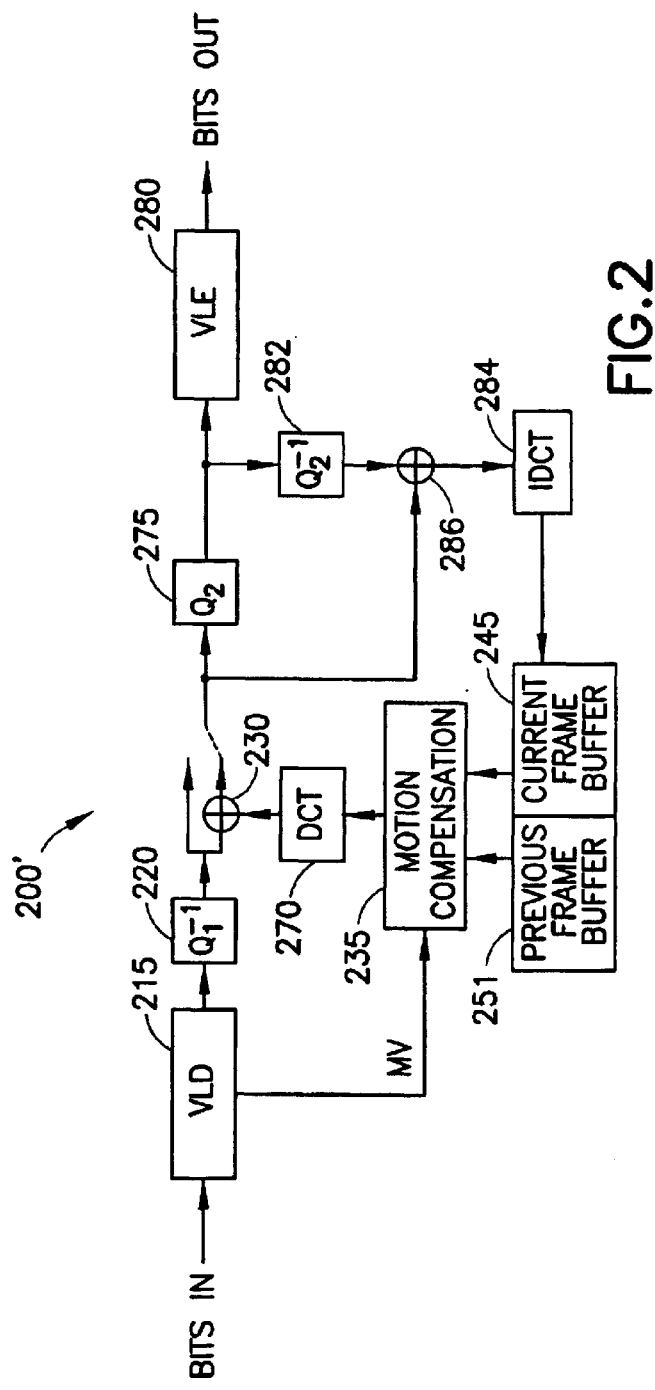
FIG. 2 illustrates a simplified transcoder for use in accordance with the present invention.
Figure 3:
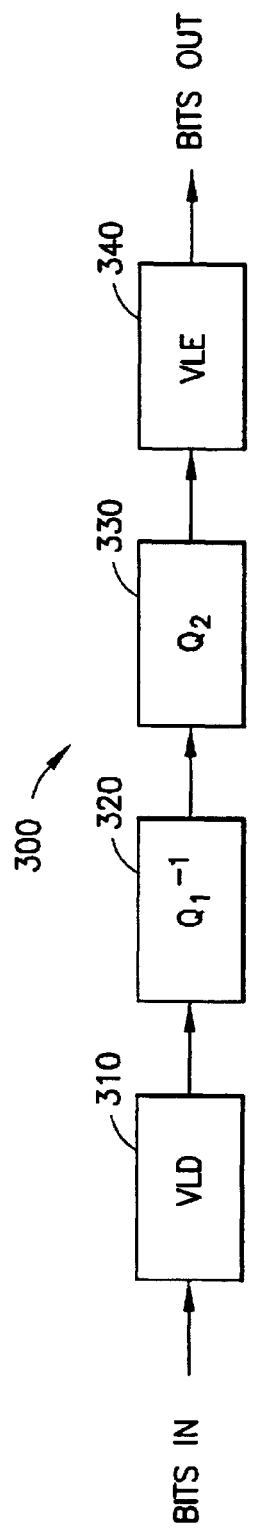
FIG. 3 illustrates a transcoder that performs requantization without motion compensation for use in accordance with the present invention.

FIG. 2 illustrates a simplified transcoder for use in accordance with the present invention.

While a straightforward transcoder can simply be a cascaded MPEG decoder and encoder, the transcoder 200 provides a simplified design that reduces computations.

The transcoder architecture 200 performs most operations in the DCT domain, so both the number of inverse-DCT and motion compensation operations are reduced. Moreover, since the motion vectors are not recalculated, the required computations are dramatically reduced. This simplified architecture offers a good combination of both low computation complexity and high flexibility.

In particular, a pre-compressed video bitstream is input to a Variable Length Decoder (VLD) 215. A dequantizer function (inverse quantizer) 220 processes the output of the VLD 215 using a first quantization step size, $Q_1$.

Motion vector (MV) data is provided from the VLD 215 to a motion compensation function 235, which is responsive to a previous frame buffer 250 and/or a current frame buffer 245 of pixel domain data. A DCT function 270 converts the output of the MC function 235 to the frequency domain and provides the result to an adder 230. A switch 231 passes either the output of the adder 230 or the $Q_1^{-1}$ function 220 to a quantization function $Q_2$ 275, which quantizes the data, typically at a coarser level to reduce the bit rate. This output is then inverse quantized at an inverse quantization function $Q_2^{-1}$ 282 for summing at an adder 286 with the output of the switch 231. The output of the adder 286 is provided to an IDCT function 284, and the output thereof is provided to the frame buffers 245 and 250.

A Variable Length. Encoder (VLE) 280 codes the output of the Quantization function 275 to provide at output bitstream at a reduced bit rate. The bit output rate of the transcoder is thus adjusted by changing $Q_2$.

FIG. 3 illustrates a transcoder 300 that performs requantization without motion compensation for use in accordance with the present invention.

Here, only re-quantization is applied to a frame, without motion compensation. Generally, IDCT and DCT operations are avoided. This strategy incurs a lower complexity, but causes some artifacts in the output data. The DCT coefficients are de-quantized then re-quantized.

In particular, a VLD 410, inverse quantizer 420, quantizer 430 and VLE 440 are used.

Figure 4:
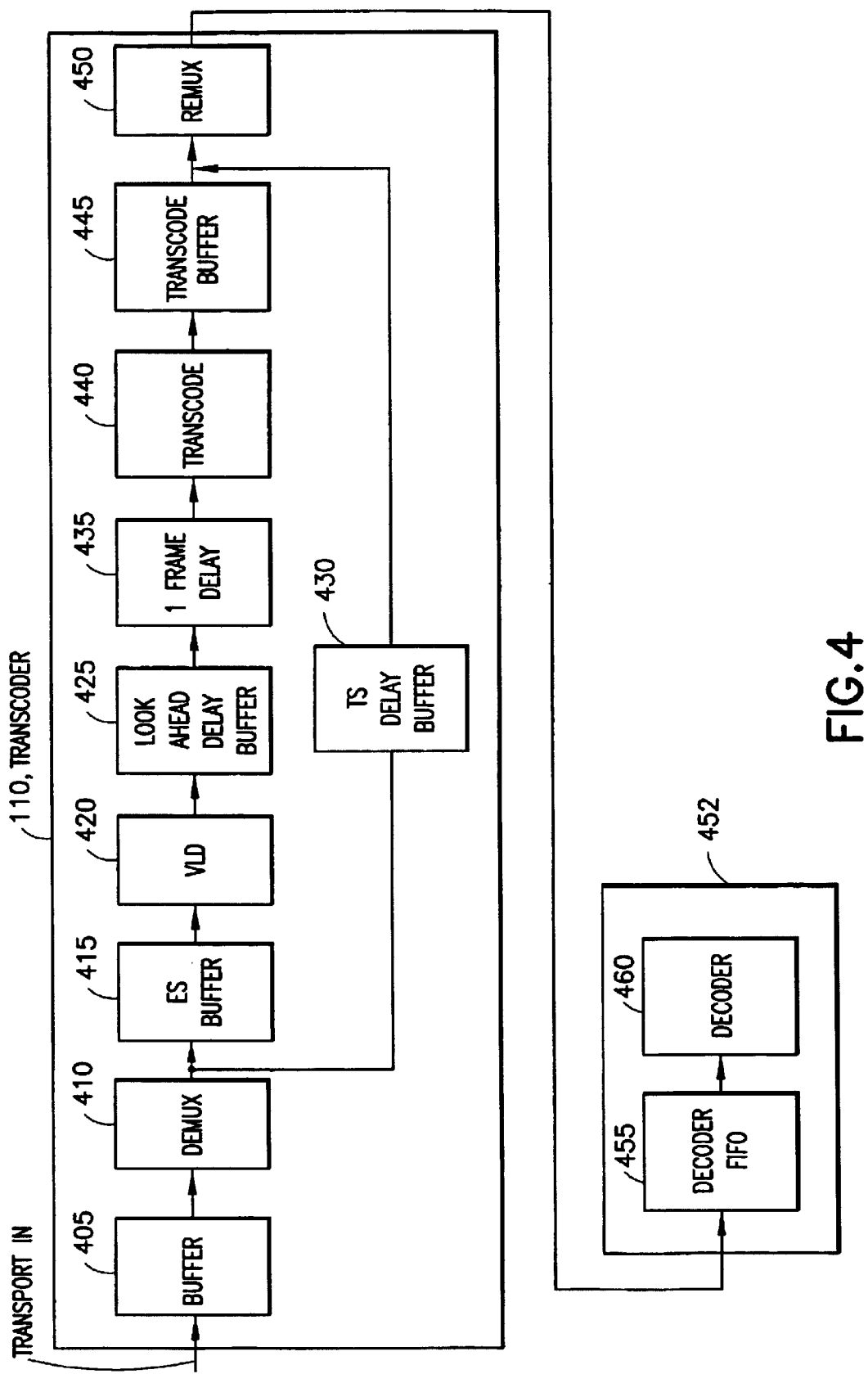
FIG. 4 illustrates an end-to-end stat remux processing delay in accordance with the present invention.

2. End-to-end Processing Delay FIG. 4 illustrates an end-to-end stat remux processing delay in accordance with the present invention.

An example one of the transcoders or TPEs 110 includes an MTS buffer 405 for buffering the input transport stream, a demux 410 for separating out the elementary streams of the different services in the transport stream, and an ES buffer 415 for storing the ESs streams. The ES data is variable-length decoded at a VLD function 420, and the result is provided to a lookahead delay buffer 425, with a capacity of, e.g., five frames. After a one-frame delay at a buffer 435, a frame is transcoded at a transcode function 440, and the result is stored in a transcode buffer 445. A remultiplexer (remux) 450 combines data from the transcode buffer 445 and data, if present, from a transport stream delay buffer 430, and the resulting transport stream is communicated to a decoder 452, such as a set-top box in a broadband communication network.

The transport stream delay buffer 430 is used for the bypass frames, discussed previously, that are not transcoded. The bypass frames are delayed to maintain synchronicity with the other channels that are transcoded.

Note that, in practice, the output stream from the transcoder 110 is combined with other transport steams from the other transcoders to form a transport multiplex that is communicated to a representative decoder 452. The decoder 452 includes a FIFO buffer 455 that buffers the incoming data, and a decoding function 460 that decodes the data to provide an output, e.g., for display on a television.

A buffer delay of, e.g., 0.5 seconds, which can vary in different implementations, is experienced by the video packets. This is a delay between the transcoding (encoding) time and the decode time. This delay occurs in both the transcoder (output) video FIFO 445 and the decoder FIFO 455. The buffer delay is fixed. If the transcoding time is delayed, the actual transcode time to decode time is shortened, but the transcode 'tick' to decode time is fixed by the buffer delay.

3. Buffer Model

Figure 5:
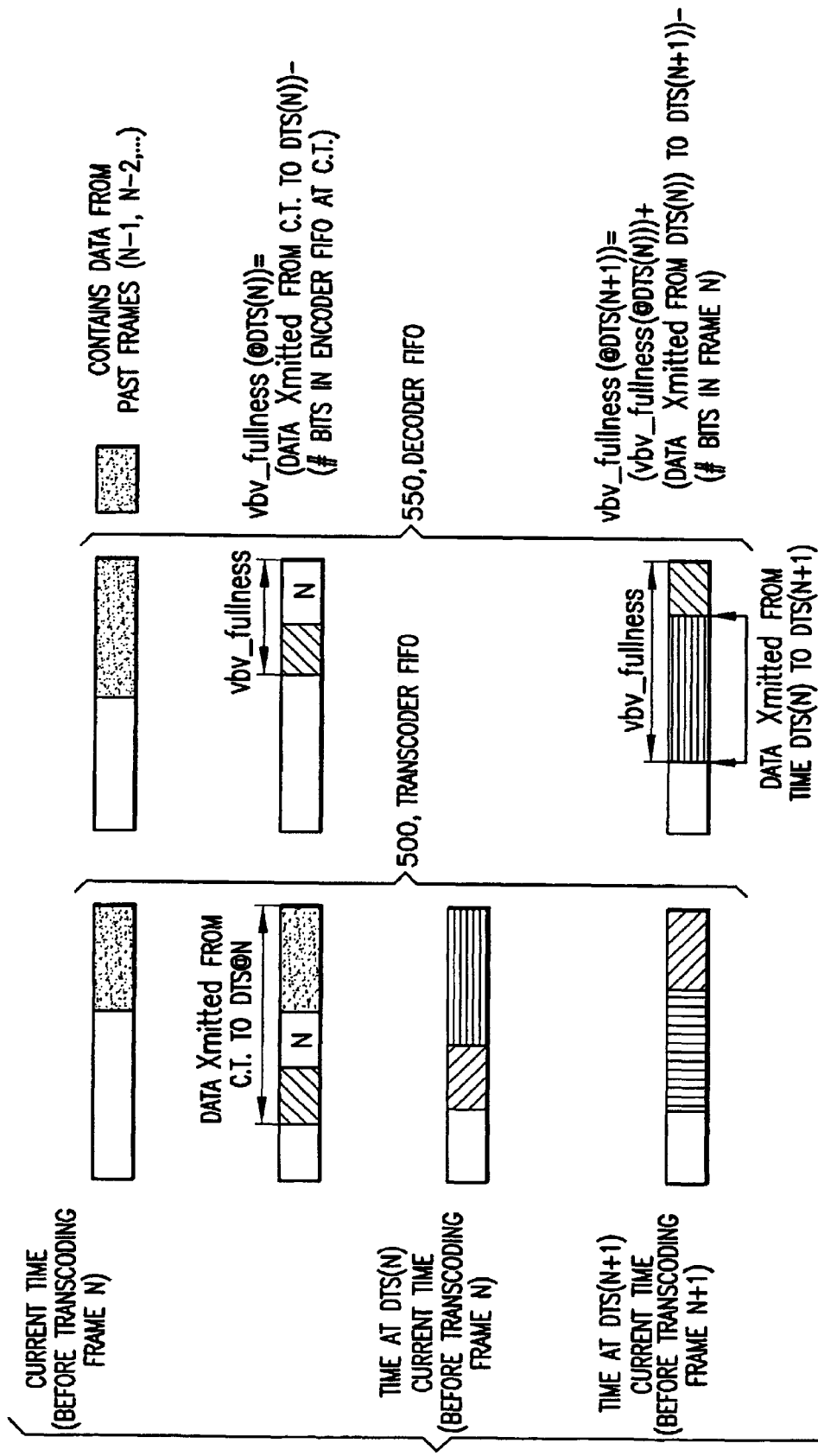
FIG. 5 illustrates a transcoder video buffering verifier (VBV) model in accordance with the present invention.

FIG. 5 illustrates a transcoder VBV model in accordance with the present invention.

The vbv model of the decoder 452 is used to limit the maximum and minimum frame size before transcoding a new frame. The level of the transcoder's bitstream output FIFO can be used to derive the decode buffer status just before the DTS of the new frame (see also FIG. 7). Specifically, the future decode buffer status (vbv_fullness) is given by vbv_fullness=(No. of bits to be transmitted from current time to the DTS time of the new frame)-(No. of bits in the encoder FIFO). The vbv_fullness calculation is shown in FIG. 5, where the composition of the transcoder FIFO is shown at 500, and the corresponding composition of the decoder FIFO is shown at 550.

Moreover, we can compute the number of bits transmitted by adding all the encoding rates starting from t seconds up to the last encoding rate issued by the QLP, (where t is the total delay through the encode plus decode buffers, i.e., the system delay.) The QLP provides the bit rate in a number of packets to output for the time period $T_q$.

Moreover, a margin needs to be added due to the uncertainty caused by the variable latency from the time the QLP issues a rate change to the time the new rate actually takes effect at the transcoder. The new bit rate is changed at the fixed period $T_q$. $T_q$ is asynchronous to the video frame time (DTS of decoder).

Figure 6:
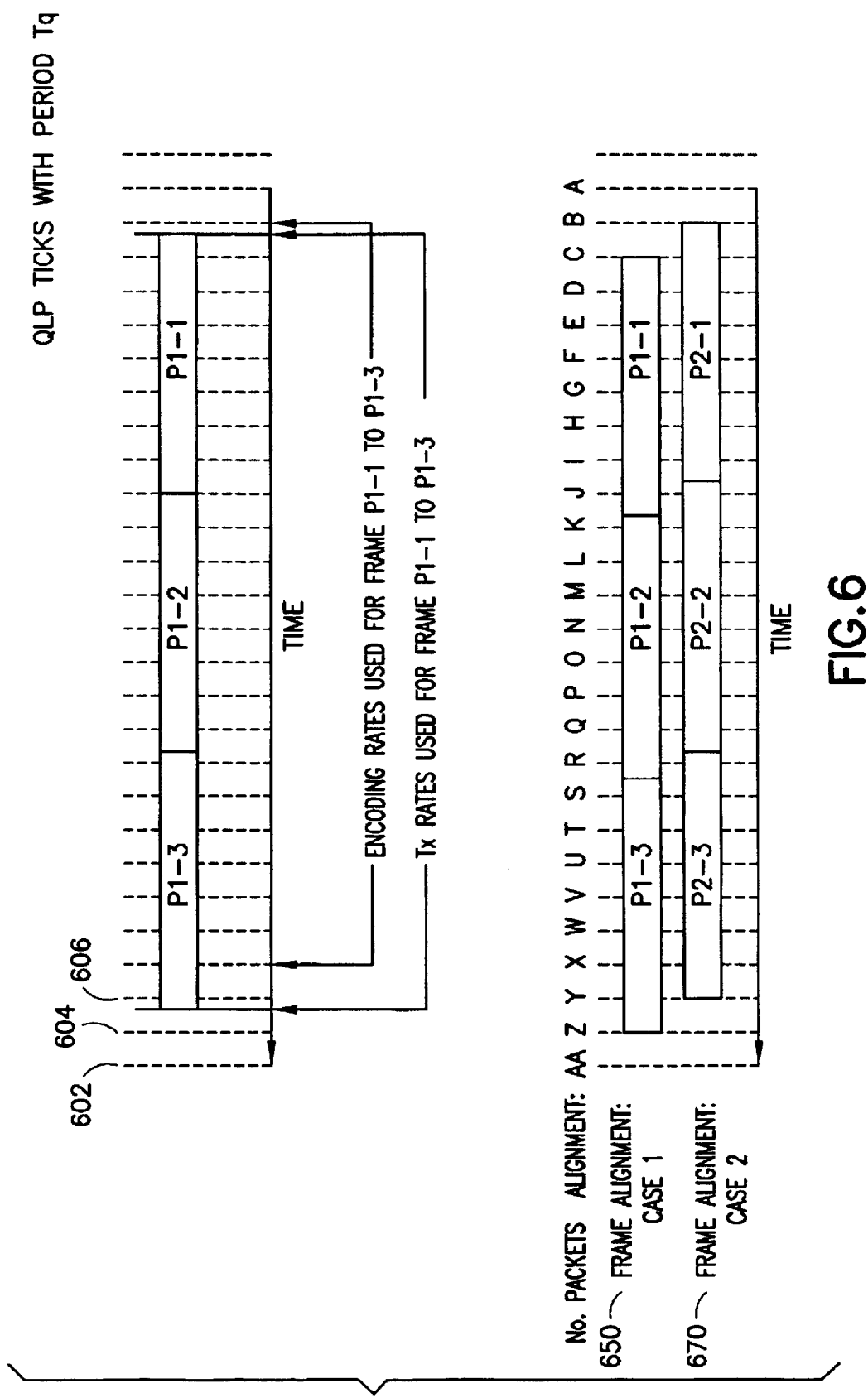
FIG. 6 illustrates transcoder rate timing in accordance with the present invention.

As shown in FIG. 6, the transcoding rates are computed at the dashed lines, e.g., 602, 604, 606, . . . This example assumes the system delay is three frames and the transmission rate needs to be computed for P1–1 to P1–3. With this notation, P1–1 denotes Program (bitstream #1) frame #1, P1–2 denotes Program (bitstream #1) frame #2, and so forth. Since the frame DTS times do not align with the rate changes, this causes a difference between the transcoding rate and the transmission rate. Moreover, since the $T_q$ period straddles two frames, the second (later) frame is assigned those packets.

The worst case rate error between transcoding and transmission is the difference in the number of packets allocated at the current time and the number of packets assigned a system delay time later (DTS of the current frame). The bottom of FIG. 6 shows the two extreme cases. In the first case (650), the frame DTS occurs just prior to $T_q$. In the second case 670, the frame DTS occurs at $T_q^+$. A through AA represent the number of packets assigned to each $T_q$ period. Both cases have the same encoding packet assignment, sum (B through X).

The number of transmission packets for case 1 is Sum(C, D, E, . . . , W, X, Y); and, for case 2, Sum(B, C, D, . . . , V, W, X). Case 2 has no difference between encoding and transmission rates, so this is the best case (DTS aligned with $T_q$). Case 1, which is the worst case, has a difference of B packets.

Therefore, the estimated number of bits to be transmitted from the current time to the DTS time is:

Σtranscoding_packets(n)±packet_count_error,
packet_count_error=(number of packets assigned at DTS time)–(number of packets assigned at current time). A positive and negative packet_count_error has different effects on frame size calculations.

Note that system delay should be a multiple of $T_q$.

With the estimated vbv fullness given by vbv_fullness=(no. of bits to be transmitted)–(bits in transcoder FIFO);

this value can be used to limit the trascoded frame size, so it will be no more than vbv_fullness. This requirement is imposed to ensure the decoder buffer will not underflow while decoding the current frame (i.e., the frame that is about to be transcoded).

The maximum frame size and minimum frame size can be derived from the sequence of transmission bit rate, snapshot of the transcoder buffer level, and the sizes of the previously transcoded frame, as follows:

Let B(t)=Buffer level at time t.
tc=time when the current frame enters the transcoder FIFO.
t0=time when the transcoder FIFO level was last read.
T(t)=Size of the frame entering the FIFO at time t.
R(t)=transmission bit rate at time t.
dts=DTS of the current frame.
nextDts=DTS of the next frame
D=decoder buffer size.

$$\text{Maximum Frame Size} = \sum_{t=tc}^{dts} R(t) - B(tc)$$

$$= \sum_{t=t0}^{dts} R(t) - \sum_{t=t0}^{tc} R(t) - \left[ B(t0) + \sum_{t=t0}^{tc} T(t) - \sum_{t=t0}^{tc} R(t) \right]$$

$$= \sum_{t=t0}^{dts} R(t) - B(t0) - \sum_{t=t0}^{tc} T(t)$$

$$\text{Minimum Frame Size} = \sum_{t=tc}^{nextDts} R(t) - B(tc) - D$$

$$= \text{Maximum Frame Size} + \sum_{t=dts}^{nextDts} R(t) - D$$

Figure 7:
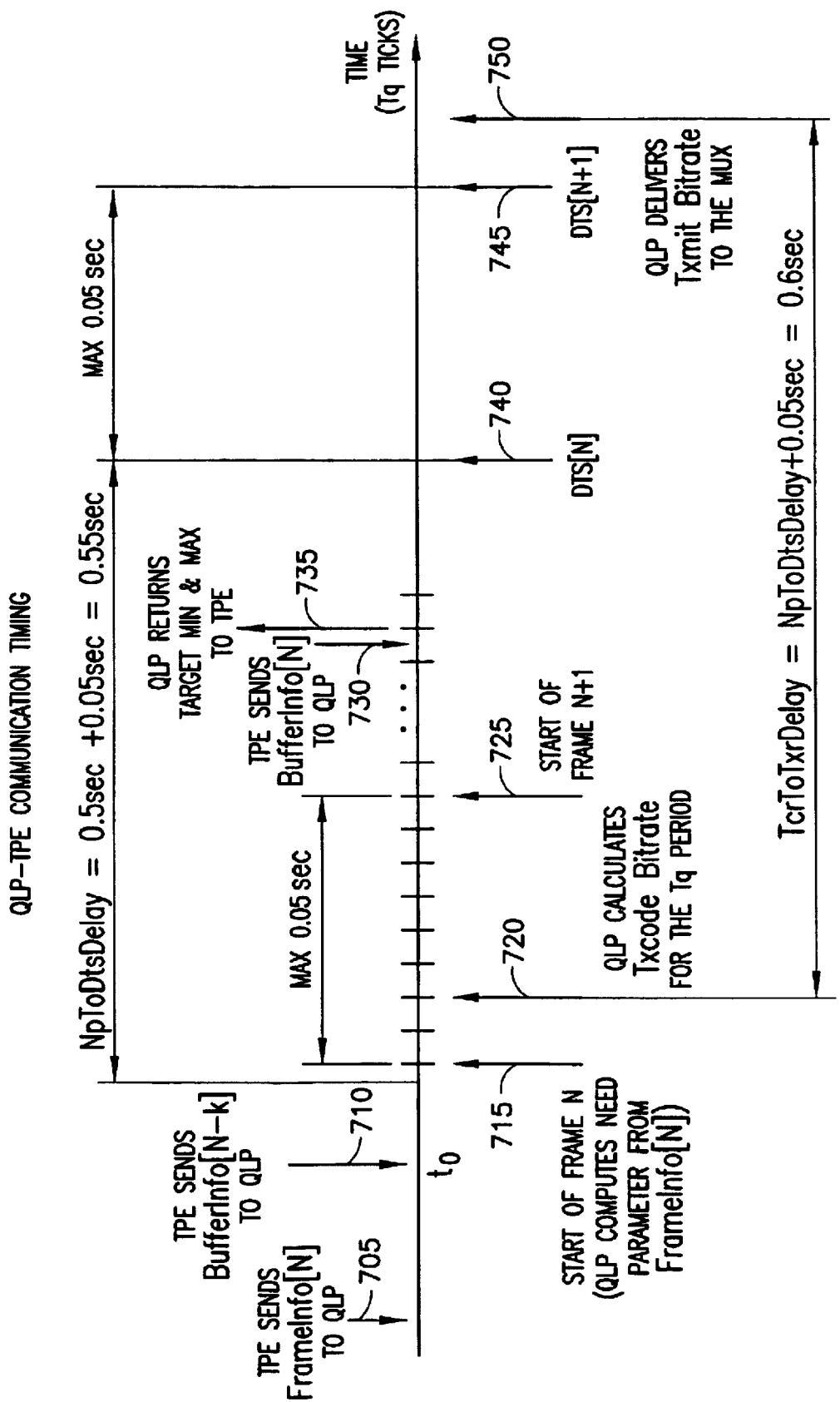
FIG. 7 illustrates communication timing between a QLP and transcoder processing elements (TPEs) in accordance with the present invention.

FIG. 7 illustrates communication timing between a quantization level processor (QLP) and transcoder processing elements (TPEs) in accordance with the present invention.

At time 705, a TPE sends statistical information for a current frame "N" to the QLP. At time 710, the TPE sends information regarding the fullness of the TPE's output buffer, which includes data from a previously transcoded frame with an index of N–k, e.g., where k=1. The previously coded frame is usually frame N–1 i.e., the previous frame. However, sometimes it might take more than one frame time to transcode a frame so the timing might "slip". In that case, the distance between the "current frame" and the frame just transcoded may be more than 1 frame, e.g., such that k=2. At time 715, transcoding starts for frame "N" using the need parameter calculated from the associated statistical information. The transcode bit rate is calculated for each Tq period, such as at example time 720.

Time 725 denotes the start of transcoding for the next frame, with index N–1.

At an example time 730, the TPE sends information regarding the fullness of its output buffer, which now contains data from frame N, to the QLP. In response, the QLP provides a target frame size, and minimum and maximum bounds for the transcoding bit rate, to the TPE at time 735.

Times 740 and 745 denote the times of the decode time stamps of frames N and N+1, respectively.

At time 750, the QLP delivers a transmission bit rate to the mux to inform the mux how many packets of data in the TPE's output buffer to output in a transport stream. This time 750 follows the transcode time 720 by a delay period.

4. Need Parameter

A bit rate need parameter is determined for each frame based on an expected complexity of the frame. An transcoding bit rate is allocated to each TPE by the QLP 130 based on the need parameters and the available bandwidth.

Referring again to FIG. 4, the bits of an input frame are first partially decoded by the variable length decoder 420, and average quantizer-scales and the number of bits in the frame are computed. A number of frames, e.g., five frames, of partially decoded coefficients and headers are stored for each video channel in the lookahead buffer 425, which provides a corresponding lookahead delay. The size of the processor SDRAM memory 132 limits the length of the lookahead buffer. Each coefficient takes two bytes, resulting in 720×480×1.5×2=1 Mbyte/frame.

At a specific time, $T_{frameStart}$, determined by the intended decode time of the frame at the target decoder 452, the need parameter is computed for the oldest frame in the lookahead buffer 425. The decode time is specified by the DTS of the frame, which is in units of 27 MHz clock ticks. $T_{frameStart}$ is defined as:

(Decode time of the frame–buffer delay–1.5 NTSC frame time).

The need parameter is computed from the average quantizer scale and the bit count of the input frames, as follows:

NeedParameter=MbResolutionAdjust*AvgQR* (CurrentQR+Alpha*PastQR)/(Beta*CurrentQR+ PastQR), where AvgQR=(sum of (avgInQuant*in FrameSize) over the most recent 15 P or B frames and the most recent I frame in the past)*900,000/(DTS of current frame-DTS of the 16$^{th}$ frame in the past). 900,000 is the number of 27 MHz units in one frame period (1/30 sec.) 27 MHz is the MPEG clock rate.

If there is no I frame within the past, e.g., 45 frames, the past 16 P or B frames are used.

For an I frame,

CurrentQR=avgInQuant*inFrameSize of the current frame.

PastQR=avgInQuant*in FrameSize of the last I frame. If there is no I frame within the past 45 frames, PastQR is set to be the same value of CurrentQR.

For a P or B frame,

CurrentQR=average of (avgInQuant*in FrameSize) over the current frame and every frame in the lookahead buffer 425 of the same picture type.

PastQR=average of (avgInQuant*in FrameSize) over past four frames of the same picture type. If there are less than 4 frames of the same picture type in the past, PastQR is set to the same value as CurrentQR.

Alpha and Beta are adjustable parameters to control the reaction of the need parameter to the change in the product of quantizer scale and bit count. Default values are Alpha= 256, Beta=256.

MbResolutionAdjust is an adjustable parameter to compensate the perceptual difference in distortion in different resolution. The lower the resolution, the more visible the distortion. Therefore the need parameter is boosted for lower resolutions. Default values of MbResolutionAdjust are 1.0 for full resolution, 1.2 for three-quarter resolution, and 1.5 for half resolution. Alternatively, or in addition, the need parameter may be adjusted based on a macroblock resolution, which is the number of macroblocks in a frame.

5. Input Bit Rate Information

In every Tq time slot, the TPEs 110, . . . , 112 and Mux 120 count the number of input transport packets and save this packet count information in circular buffers on the QLP 130. There is one circular buffer of input bit rate information for each video program/channel processed by the TPES, and one circular buffer of bit rate information for all the data stream that is passed directly to the Mux 120 without going through a TPE (i.e., in the passthrough mode). Each circular buffer has, e.g., 1024 entries, and each entry stores the bit rate information of one Tq time slot. The 1024 entries is just a design parameter that can vary for different implementations. The circular buffer should be large enough to hold the data for the 0.6 sec delay. From the packet counts, the QLP 130 can calculate the instantaneous input bit rate for each Tq time slot as follows:

BitRate (bits per second)=PktCount*188*8/TqPeriod.

The Mux 120 counts the number of transport packets (except null packets) in each data service, which may comprise one or more MPEG programs. The QLP 130 uses the packet count to compute the instantaneous data service input bit rate for each Tq time slot. The Mux saves the packet count information in circular buffers on the QLP in the same way as the packet count information from the TPEs is saved.

The processes in which the Mux 120 and the TPEs write packet count information into the QLP's circular buffers are asynchronous with the Tq ticks. A Tq index which is saved with the packet count information is used to synchronize the QLP with the input packet count information during the initialization process.

The Tq index is maintained by the QLP. The QLP sets the Tq index to 0 at initialization, and increases it by 1 on every Tq interrupt. The QLP periodically broadcast the Tq index and the associated time to the TPEs 110, . . . , 112 and the Mux 120.

During the transcoding bit rate allocation process, the QLP 130 sets aside the bandwidth for the pure passthrough video channel(s) and the non-video channels. Since the transmission bit rate of the packets in these passthrough channels has to match the bit rate of the corresponding packets at the input, the bit rate to set aside for each passthrough video channel equals the instantaneous input bit rate at time PacketCountDelay=PassThroughDelay–TcrToTxrDelay prior to the current time, where PassThroughDelay is the delay of the packets in the video passthrough channels (from demux 410 to remux 450), which is fixed at (0.5 sec. +6 NTSC frame periods)=0.7 sec. in the example implementation. The non-video PIDs have the same amount of delay.

TcrToTxrDelay is the delay from the calculation of the transcoding rate (current Tq tick) to the implementation of the transmission bit rate (FIG. 7).

This delay is fixed at (0.5 sec+1.5 NTSC frame periods+ 1.5 NTSC frame periods)=0.6 sec.

Therefore, PacketCountDelay is a constant equal to 0.7 sec–0.6 sec=0.1 sec. The number of Tq ticks equivalent to this delay is: PacketCountDelayIndex=(PacketCountDelay/ TqPeriod).

The QLP 130 synchronizes the input packet count information with the current Tq interrupt as follows.

For each circular buffer, the QLP maintains a 10 bit read pointer. Initially, the QLP searches for the entry in the circular buffer whose tqIndex matches the value of (CurrentTqIndex-PacketCountDelayIndex). For every Tq tick after that, the QLP increases the value of the read pointer by one. The QLP also checks the continuity of the TqIndex stored with the packet count in the circular buffer. If there is a discontinuity, the QLP sets a warning flag to the KP 140, and re-initializes the read pointer by searching for the TqIndex that matches (CurrentTqIndex-PacketCountDelayIndex).

For every input frame, the QLP calculates the average input bit rate over a frame. This computation is performed at the same time as the frame's need parameter calculation. The average input bit rate is used for the calculation of the target frame size.

First, the QLP computes the number of integer Tq periods straddled by the frame:

FrameTqCount=(difference between the decode time of the next frame and decode time of current frame)/TqPeriod, rounding to the next higher integer.

The QLP computes the duration of the frame from FrameTqCount:

FrameDuration=FrameTqCount*TqPeriod.

Then, the QLP computes the average input bit rate:

AvgInBitrate=InPacketCount*188*8*/FrameDuration, where InPacketCount is the sum of PacketCount over FrameTqCount entries of the video packet count circular buffer, starting from the current read pointer.

6. Bandwidth Allocation

At every Tq slot, the QLP performs the bandwidth allocation procedure. The QLP first assigns the bandwidth to the pure passthrough video programs, and to the data and audio programs, which are not transcoded. The remaining bandwidth is then allocated to the remaining channels based on the values of their need parameters, and subject to the maximum and minimum bit rate constraints.

6.1. Passthrough Video and Data Channels

The QLP 130 assigns the transcoding bit rate to the pure passthrough channels as follows.

if (purePassThrough)

TcodeBitrate=VideoInBitrate where VideoInBitrate is the instantaneous input video bit rate computed as:

VideoInBitrate=(PacketCount value stored in the corresponding video program circular buffer entry at the current read pointer)*188*8/TqPeriod.

For each statmux group, the QLP calculates the amount of bandwidth that is available for dynamic allocation, that is, the amount of bandwidth available after deducting the bandwidth of the pure passthrough channels and the PES alignment overhead bits. A stat remux group refers to a group of channels at the transcoder 100 that are competing for bandwidth with one another. One or more stat remux groups may be used at the transcoder 100.

AvailableVideoBitrate=TotalOutputBandwidth−(sum of NonvideoInBitrate over all channels)−(sum of TcodeBitrate over all pure passthrough channels)−(Number of channels that are not pure passthrough* PesoverheadBitrate).

In this equation, TotalOutputBandwidth is the total output transport (payload) bandwith available for video, audio, and data services in the input streams, including system information. This is a user-configured parameter for the statmux group.

PesOverheadBitrate is the average overhead bit rate for PES alignment, which is a constant:

PesOverheadBitrate=½*184*8*30=22.08 Kbps.

The instantaneous non-video bit rate (NonVideoInBitrate) is compute in a similar way as the VideoInBitrate:

NonVideoInBitrate=(PacketCount value stored in the corresponding non-video PID's circular buffer entry at the current read pointer)*188*8/TqPeriod.

6.2. Transcoding Bit Rate Allocation

For each statmux group, the QLP allocates the AvailableVideoBitrate among the non-passthrough video channels subject to the following constraints:

1. The sum of transcoding bit rates=GroupBandwidth. Since the bandwidth available for dynamic allocation is variable, and subject to the bandwidth occupied by the passthrough components (e.g., non-video data) in the transport stream, the group bandwidth is expressed as a percentage of the total available bandwidth when there is more than one statmux group configured for the output transport multiplex.

2. The sum of the average transcoding bit rate for all non-pure-passthrough video channels on any single TPE has to be less than an upper bound that is determined by the Variable Length Encoder's (380, 440) maximum throughput on the TPE.

3. For a pure passthrough channel, the output bitrate should be equal to the input bit rate. A channel may be processed as a pure passthrough channel, e.g., to preserve its quality.

4. For any video channel, the output target frame size cannot be bigger than the input frame size. This translates to the constraint that the average transcoding bit rate cannot exceed the average input bit rate.

5. The target frame size cannot be higher than a maximum value, nor lower than a minimum value, which are provisioned to protect the video buffers.

The procedure of transcoding bit rate allocation is outlined as follows.

6.2.1. Compute an Approximation of the Maximum Frame Size

The maximum transcoded frame size to protect the decoder buffer from underflow is given by:

maxFrameSize=(number of bits transmitted to the decoder 452 from the time the first bit of the transcoded frame enters the transcoder FIFO 445 to the decode time of the frame)−(transcoder FIFO level at the time the first bit of the transcoded frame enter the FIFO).

However, the transcoder FIFO level at the time the first bit of the transcoded frame enters the FIFO is not known at the time the transcoding bit rate is calculated. Therefore, an approximation of the maximum transcoded frame size is calculated as follows:

maxFrameSizeEstimate=delayBitsMax−FifoLevel−offsetBitsMax.

The value of delayBitsMax is the number of bits transmitted to the decoder 452 from the last time the FIFO level was read to the decode time of the frame, and is calculated by:

delayBitsMax=TqPeriod*sum of transmission bit rate values in the transmission bit rate queue for Ndelay terms starting from FrameMarker, where:

Ndelay=Number of Tq slots counting from the time when the FifoLevel is read to the time when the frame is decoded.

The value of FifoLevel is the most recent output FIFO level of the transcoder.

The value of offsetBitsMax is the approximate number of bits entering the transcoder FIFO from the time the FIFO level was last read to the time the first bit of the target transcoded frame enters the FIFO. This approximation is given by the sum of the initial (unbounded) target frame sizes of the frames waiting to be transcoded. This is equal to:

offsetBitsMax=Size of the most recent output frame+target frame size of the frame currently being transcoded+sum of target frame sizes of the frames preceding the current frame that are waiting to be transcoded.

In the approximation of the maximum frame size, it is assumed that the number of bits generated by the future transcoded frames meets the frame target, and the initial frame target values in the QLP's output queue 132 do not hit the maximum frames size nor the minimum frame size.

6.2.2. Compute an Estimate of the Minimum Frame Size

The minimum transcoded frame size to protect the decoder 452 from overflow is given by:

MinFrameSize=(number of bits transmitted to the decoder from the time the first bit of the transcoded frame enters the transcoder FIFO to the decode time of the next frame)−(Size of the decoder's buffer)−(transcoder FIFO level at the time the first bit of the transcoded frame enters the FIFO).

It can be show that MinFrameSize is related to MaxFrameSize by:

MinFrameSize=MaxFrameSize+(Number of bits transmitted to the decoder from the decode time of the current frame to the decode time of the next frame)−(Size of decoder's buffer).

Therefore,

MinFrameSizeEstimate=MaxFrameSizeEstimate+ DeltaBitsMin−DecoderBufferSize, where DeltaBitsMin=Number of bits transmitted to the decoder from the decode time of the current frame to the decode time of the next frame, which can be calculated by summing the corresponding terms in the queue of the transmission bit rate.

In the example implementation, DecoderBufferSize is the size of the MPEG2 Main Profile, Main Level buffer size, which is 1.835 Mbits.

6.2.3. Compute the Maximum Transcoding Bit Rate that Protects the Buffer

A maximum transcoding bit rate must be set to avoid a decoder buffer overflow. The target frame size of a frame is computed as the input frame size scaled by the ratio of the average transcoding bit rate to the average input bit rate. Therefore, the maximum transcoding bit rate is calculated as follows from the maximum frame size, assuming the transcoding bit rate remains constant until the end of the frame time:

MaxTcodeBitrate=((MaxFrameSize/OrigFrameSize) *AvgInBitrate*FrameTqCount−(Sum of transcoding bit rate from the beginning of the frame to the current Tq interrupt) *FrameTqIndex)/(FrameTqCount−FrameTqIndex), where OrigFrameSize is the number of bits in the input frame, FrameTqCount is the number of Tq time slots in the frame time, and FrameTqIndex is the number of Tq time slots since the start of the frame ($T_{framestart}$)

6.2.4. Compute the Minimum Transcoding Bit Rate that Protects the Buffer

A minimum transcoding bit rate must be set to avoid a decoder buffer underflow. For each video service, the minimum transcoding bit rate is computed in a manner that is similar to the maximum transcoding bit rate:

MinTcodeBitrate=((MinFrameSize/OrigFrameSize) *AvgInBitrate*FrameTqCount−(Sum of transcoding bit rate from the beginning of the frame to the current Tq interrupt) *FrameTqIndex)/(FrameTqCount−FrameTqIndex).

6.2.5. Calculate the Maximum Aggregated Bit Rate that can be Processed by each TPE The average output bit rate among all video services on any single TPE over a window (e.g., 3 frame periods) is constrained by the processing power of the VLE in the TPE, e.g., the throughput is constrained to no more than an average of 12 Mbits/sec. spread (a processor-dependent value) over a 3 frame window. At any Tq period, the maximum bit rate supported by a TPE is calculated as follows:

MaxTpeBitrate=(NTq*VleThroughput)−(Sum of transcoding bitrate values of every video channel on the TPE over the past $N_{Tq}$−1 Tq interrupts), where $N_{Tq}$=number of Tq time slots in the averaging window, e.g., 3 NTSC frame time (100 ms); VleThroughput is the throughput of the VLE in terms of average bit rate, e.g., 12 Mbits/sec.

6.2.6. Distribute the Available Bit Rate Among The Video Channels

The following procedure applies to each stat remux group.

1. The QLP determines the ideal bandwidth allocation in absence of minimum and maximum bitrate constraints.
   NominalBitrate = AvailableVideoBitrate / Number of video channels in the statmux group
   TotalNeed = Sum of NeedParameter over every video channel
   if (TotalNeed > 0)
   for (every video channel)
   {
   NeedBitrate[channel] = AvailableVideoBitrate * NeedParameter [channel] / TotalNeed
   }
   } else {
   for (every video channel)
   NeedBitrate [channel] = NominalBitrate
   }
2. Each video channel is assigned the MinTcodeBitrate of the channel. If the sum of MinTcodeBitrate exceeds the AvailabeVideoBitrate, the bandwidth is distributed in proportion to the MinTcodeBitrate.
   TotalMinBitrate = sum of MinTcodeBitrate over the statmux group
   if (TotalMinBitrate > AvailableVideoBitrate)
   {
   for (every video channel)
   {
   TcodeTcodeBitrate [channel] = MinTcodeTcodeBitrate [channel] * AvailableVideoBitrate / TotalMinBitrate
   }
   AvailableVideoBitrate = 0
   Done with transcoding bit rate allocation.
   } else {
   for (every video channel) {
   TcodeBitrate [channel] = MinTcodeBitrate [channel]
   NeedBitrate [channel] = Max ( 0, NeedBitrate[channel] − MinTcodeBitrate [channel] )
   }
   AvailableVideoBitrate = AvailableVideoBitrate − TotalMinBitrate
   }
3. The QLP then tries to satisfy the user minimum bit rate requirement. The QLP bounds the user minimum bit rate by the MaxTcodeBitrate before applying the user minimum bitrate.
   for (every video channel)
   {
   if (UserMinBitrate[channel] > MaxTcodeBitrate [c])
   minBitrate [channel] = MaxTcodeBitrate [channel]
   else
   minBitrate [channel] = UserMinBitrate[channel]
   }
   ExtraMinBitrate = Sum of (minBitrate − MinTcodeBitrate) over every channel that UserMinBitrate is higher than MinTcodeBitrate.
   if (ExtraMinBitrate > AvailableVideoBitrate)
   {
   for (every video channel)
   {
   if (minBitrate[channel] > MinTcodeBitrate[channel])
   {
   extraBitrate = ( minBitrate[channel] − MinTcodeBitrate[channel]) * AvailableVideoBitrate / ExtraMinBitrate
   TcodeBitrate[channel] = TcodeBitrate[channel] + extraBitrate
   needBitrate [channel] = Max (0, needBitrate[channel] − extraBitrate)

-continued

```
                }
            }
            AvailableVideoBitrate = 0
        } else {
            for (every video channel)
            {
                if (minBitrate[channel] >
    MinTcodeBitrate[channel])
                {
                    extraBitrate = minBitrate[channel]
    - MinTcodeBitrate[channel]
                    TcodeBitrate[channel] =
    TcodeBitrate[channel] + extraBitrate
                        needBitrate [channel] = Max (0,
    needBitrate[channel] - extraBitrate)
                        AvailableVideoBitrate =
    AvailableVideoBitrate - extraBitrate
                }
            }
        }
4.  The QLP calculates the a maximum bit rate value for
    each channel based on the user maximum bit rate, the
    maximum and minimum transcoding bit rates to protect
    the decoder buffer, and the maximum processing bit
    rate that can be supported by each TPE.
        for (every TPE)
        {
            tpeAvailableBitrate = MaxTpeBitrate[tpeIndex]
    - sum of TcodeBitrate over the TPE
            tpeNeedBitrate = sum of NeedBitrate over the
    TPE
            for (every channel processed by the TPE)
                MaxBitrate[channel] = Min (
    MaxTcodeBitrate[channel],
                (tpeAvailableBitrate * NeedBitrate[channel] /
    tpeNeedBitrate) + TcodeBitrate[channel],
                Max ( UserMaxBitrate[channel],
    MinTcodeBitrate[channel] ) )
        }
5.  The QLP assigns the remaining bandwidth in proportion
    to the remaining NeedBitrate values.
            TotalNeedBitrate = sum of needBitrate over
    all video channels
            for (every video channel) {
                TcodeBitrate[channel] = TcodeBitrate[channel]
    + (AvailableVideoBitrate * NeedBitrate[channel] /
    TotalNeedBitrate)
            }
            AvailableVideoBitrate = 0
6.  The QLP applies the maximum bit rate constraint on
    the bit rate allocation.
        for (every video channel)
        {
            if ( TcodeBitrate[channel] >
    MaxBitrate[channel]
            {
                TcodeBitrate [channel] =
    MaxBitrate[channel]
                AvailableVideoBitrate =
    AvailableVideoBitrate + TcodeBitrate[channel] -
    MaxBitrate[channel]
                NeedBitrate [channel] = 0
            }
        }
7.  The QLP allocates the extra bandwidth collected from
    the channels that exceed the maximum bit rate.
            TotalNeedBitrate = Sum of NeedBitrate over every
    channel
            if (AvailableVideoBitrate > 0)
            {
                for (every video channel)
                {
                    extraBitrate = AvailableVideoBitrate *
    NeedBitrate[channel] / TotalNeedBitrate
                    if ( extraBitrate + TcodeBitrate[channel] >
    MaxBitrate[channel] )
                        extraBitrate = MaxBitrate[channel] -
    TcodeBitrate[channel]
                        TcodeBitrate[channel] = TcodeBitrate[channel]
    + extraBitrate
                        AvailableVideoBitrate =
    AvailableVideoBitrate - extraBitrate
                }
            }
8.  The QLP allocates the remaining bandwidth in
    proportion to the difference between the current
    allocated bit rate and the maximum bit rate.
            if (AvailableVideoBitrate > 0)
            {
                TotalHeadroom = sum of
    (MaxBitrate[channel] - TcodeBitrate[channel]) over
    every channel
                for (every channel)
                {
                    TcodeBitrate[channel] =
    TcodeBitrate[channel] + AvailableVideoBitrate * (
    MaxBitrate[channel] - TcodeBitrate[channel] ) /
    TotalHeadroom
                }
            }
```

The QLP maintains a queue of the transcoding bit rate for each video channel. In each Tq interrupt, the calculated transcoding bit rate values are stored in the queues, and retrieved 0.5 seconds later to use as transmission bit rate values.

6.2.7. Initial Target Frame Size Calculation

At the last Tq slot of a frame, the QLP calculates an initial value for the target frame size as follows.

InitialTargetFrameSize=(OrigFrameSize*AvgInBitrate/ AvgTcodeBitrate, where AvgTcodeBitrate is the average transcoding bit rate for the frame, defined as the sum of TcodeBitrate over all Tq slots occupied by the frame.

The TPEs may not be ready to transcode a new frame at this time, therefore the QLP maintains a target frame size queue for each video channel. The InitialTargetFrameSize value is stored in the queue for the corresponding channel, and is retrieved later when the TPE is ready to transcode the frame.

6.3. Passthrough Decision

At the first Tq interrupt of a frame, the QLP decides whether to pass through a frame or not. The pass through decision is made based on the transcoding bit rate calculated at the first Tq slot of the frame as follows for each channel at the beginning of a new frame.

PassThroughBitrate= PassThroughMargin*OrigFrameSize/FrameTqCount;

where PassThroughMargin is a parameter less than but close to 1.0, e.g. 0.95; OrigFrameSize is the number of bits in the input frame; and FrameTqCount is the number of Tq slots in the frame. The use of PassThroughMargin allows the input frames whose size is slightly higher than the target frame size to be passed through, thereby preserving the quality of the frame, and also saving transcoder processing cycles.

```
if ( TcodeBitrate > PassThroughBitrate )
{
        Pass through the entire frame.
} else {
        Transcode the frame.
}
```

6.4. Target Frame Size Calculation

The QLP calculates the maximum frame size and the minimum frame size values based on the latest buffer level information as soon as it receives a message from the TPE that signals the TPE is ready to transcode a new frame. The QLP then pulls the target frame size out from the target frame size queue 132, and computes the final value of the target frame size using maximum and minimum frame size constraints.

6.4.1. Compute the Maximum Frame Size

The QLP calculates the maximum frame size to protect the decoder buffer from underflow. The calculation is similar to that of the approximate maximum frame size calculation during the Tq interrupts (6.2.1):

MaxFrameSize=DelayBits=FifoLevel−LastOutputFrameSize.

The value of DelayBits is the number of bits transmitted to the decoder from the time the FIFO level was read to the decode time of the frame, and can be calculated by summing the corresponding transmission bit rate values currently in the transmission bit rate queue.

The value of FifoLevel is the transcoder FIFO level latched by the transcoder. That is, the FifoLevel is read by the transcoder and passed to the QLP.

6.4.2. Compute the Minimum Frame Size

The QLP calculates the minimum frame size to protect the decoder buffer from underflow. The calculation is similar to that of the approximate minimum frame size calculation during the Tq interrupts (6.2.2). The minimum frame size is related to the maximum frame size by:

MinFrameSize=MaxFrameSize+(Number of bits transmitted to the decoder from decode time of the current frame to the decode time of the next frame)−(Size of decoder's buffer).

As mentioned before, for MPEG2 Main Profile Main Level, the decoder's buffer size is 1.835 Mbits.

6.4.3. Compute the Carryover From the Previous Frame

The transcoders may not be able to generate exactly the number of bits equal to the target frame size. The surplus or deficit of bits from transcoding the previous frame is lumped in with the target frame size of the current frame. This deviation (surplus or deficit) is calculated as:

FrameCarryOver=LastOutputFrameSize−(TargetFrameSize of previous frame).

6.4.4. Compute the Target Frame Size

The QLP pulls the InitialTargetFrameSize value out from the target frame size queue of the corresponding video channel, and bounds the target frame size by the maximum and minimum values:

TargetFrameSize=Min (MaxFrameSize, Max (MinFrameSize, InitialTargetFrameSize+FrameCarryOver)

The QLP then sends the values of MinFrameSize, MaxFrameSize, and TargetFrameSize to the TPEs. These values are used to guide the rate control of the transcoding process.

6.5. Quantization Control

Within a frame, the following algorithm is used for calculating the quantization scale value for every macroblock to be transcoded. A new quantization scale $Q_{New}$ is calculated by scaling the quantization scale of the input macroblock $Q_{Old}$ by a targeted bit reduction ratio, $R_{New}/R_{Old}$. Typically, each macroblock has a quantizer scale. However, a group of macroblocks, such as in a slice or other grouping, may be associated with a common quantizer scale. In this case, a new quantization scale is determined for the group.

Initialization:

$R_{Old}$=original number of bits in the frame.

$R_{New}$=TargetFrameSize=Target number of bits to be generated by transcoding/requantizing the frame. For every slice, do:

```
{
$Q_{New}$ = $Q_{Old}$ * $R_{Old}$ / $R_{New}$
/* Update $R_{Old}$ and $R_{New}$ after requantizing a slice:
*/
$R_{Old}$ = $R_{Old}$ − original number of bits in the slice.
$R_{New}$ = $R_{New}$ − new number of bits generated by
transcoding (e.g., including requantizing) the slice.
}
```

For $Q_{New}$, rounding to the next higher integer, or to the closest integer, may be used. The above formula should result in the frame being transcoded to the target frame size. The transcoded frame size may go over the target, but it should not exceed the maximum frame size.

However, if the maximum frame size is reached very early in the frame, which can happen, e.g., if the quantization scale at the beginning of the frame is low, thereby generating a lot of bits, the quantizer scale is set to the maximum level (coarsest quantizing) and the rest of the frame will consequently have very poor quality. To avoid this, a minimum number of bits per macroblock, mb_budget, are allocated. As the frame is transcoded, if a running count of the number of bits used grows too large, i.e., the number of bits used reaches a certain level, which is adjusted as requantization of the frame progresses, a panic quantizer is set for a short time until there are enough bits left for the remaining macroblocks to have mb_budget number of bits. That is, the panic_level is a quantizer level to try to force the MBs to have $mb_{13}$ budget or smaller number of bits. This spreads the panic quantizer over the frame, such that only a portion of the frame may go into the panic mode. To achieve this, at the beginning of each frame, initialize the following variables:

$$mb\_budget = \frac{TargetFrameSize}{number\_mbs} \cdot \xi$$

$$panic\_level = MaxFrameSize - mb\_budget * number\_mbs$$

$\xi$ determines the minimum number of bits allocated to each macroblock as a fraction of the average number of bits per macroblock using the frame target size, $T_o$. The range is $0<\xi<1$. A $\xi$ of ¼–½ may be suitable for most cases. If $\xi$ is too big, the panic condition may be triggered too early; if $\xi$ is zero, then the panic condition may trigger too late, whereby the rest of the frame is stuck in panic mode.

After each macroblock is coded, panic_level=panic_level_bits_used_mb+mb_budget if (panic_level<0)

$Q_{Mew}$=MAX_QL;

where MAX_QL=112 (e.g., the applicable maximum QL for the system).

If the frame size is less than the minimum frame size, zeros are appended to the end of the bitstream, is such that the frame size is equal to, or greater than, the minimum frame size.

6.6. PCR Slot

The MPEG standard requires the PCR (Program Clock Reference) to be sent at a maximum interval of 100 ms. The actual PCR value is not known until the transmission time, so the transcoder creates a placeholder slot for the PCR.

From the target frame size, the QLP estimates the time used for transmitting the frame, hence the minimum number of PCRs required to be inserted in the frame to satisfy the maximum PCR interval requirement. In satisfying this requirement, note that while uncoded pictures have constant duration (1/30 sec), coded bitstreams may have a variable duration for each frame. For example, if a frame has 100,000 bits and is transmitted at 1 Mbps, the duration is 0.1 sec. If the frame is transmitted at 2 Mbps, then the duration is 0.05 sec. The amount of time required to transmit the frame (or, more precisely, the time lapse from the time the first bit of the frame leaves the transcoder's output buffer (FIFO) 445 to the time the last bit of the frame leaves the FIFO) is estimated as:

TxFrameDuration=TargetFrameSize/(minimum value in the transmission bit rate queue).

The minimum number of PCRs to insert during the frame is:

MinPcrCount=TxFrameDuration/MaxPcrSeparation, round up to the nearest integer, where MaxPcrSeparation is the maximum separation between PCRs as required by MPEG (100 ms). The value of MaxPcrSeparation=80 ms is used to provide a 20 ms margin.

Accordingly, it can be seen that the present invention provides an efficient statistical remultiplexer for processing data in a number of channels that include video data. In one aspect of the invention, transcoding of the video data is delayed while statistical information is obtained from the data. Bit rate need parameters for the data are determined based on the statistical information, and the video data is transcoded based on the respective bit rate need parameters following the delaying.

In another aspect of the invention, a transcoding bit rate for video frames at the stat remux is updated a plurality of times at successive intervals to allow a closer monitoring of the bit rate. Moreover, minimum and maximum bounds for the transcoding bit rate are updated in each interval. Thus, a portion of a frame is transcoded in a first interval, then the transcoding bit rate is updated, then a second portion of the frame is transcoded in a second interval, and so forth.

In yet another aspect of the invention, the pre-transcoding quantization scales of the macroblocks in a frame are scaled to provide corresponding new quantization scales for transcoding based on a ratio of a pre-transcoding amount of data in the frame and a target, post-transcoding amount of data for the frame. Moreover, the quantization scales are adjusted for different portions of the frame as the portions are transcoded to ensure that a minimum amount of transcoding bandwidth is allocated to each macroblock.

Although the invention has been described in connection with various preferred embodiments, it should be appreciated that various modifications and adaptations may be made thereto without departing from the scope of the invention as set forth in the claims.

What is claimed is:

1. A method for processing data in a statistical remultiplexer that receives a plurality of channels comprising encoded video frames, including a particular video frame that comprises a plurality of macroblocks in associated portions of the particular video frame, each macroblock having an associated old quantization scale when the particular video frame is input to the statistical multiplexer, comprising the steps of:

computing a target amount of data that is expected to result from transcoding the particular video frame; and determining new quantization scales for use in transcoding corresponding macroblocks in a first portion of the particular video frame in accordance with (a) the corresponding old quantization scales, and a ratio of (b) a pre-transcoding amount of data in the particular video frame to (c) the target amount of data.

2. The method of claim 1, comprising the further step of: rounding the new quantizer scales to an integer value.

3. The method of claim 1, wherein:

the portions comprise respective slices of the particular video frame.

4. The method of claim 1, wherein:

the new quantizer scales are adjusted, if necessary, to be no finer than the corresponding old quantizer scales.

5. The method of claim 1, wherein:

the new quantizer scales are adjusted, if necessary, to ensure that the corresponding macroblocks receive a minimum number of bits for transcoding thereof.

6. The method of claim 1, comprising the further step of:

determining new quantization scales for use in transcoding macroblocks in a second portion of the particular video frame in accordance with (a) the corresponding old quantization scales, and a ratio of (b) a pre-transcoding amount of data in remaining portions of the particular video frame to (c) a target amount of data that is expected to result from transcoding the remaining portions.

7. The method of claim 6, wherein:

the target amount of data that is expected to result from transcoding the remaining portions is determined by decrementing the target amount of data that is expected to result from transcoding the particular video frame by an amount of data generated in transcoding the first portion.

8. The method of claim 6, wherein:

the pre-transcoding amount of data in the remaining portions is determined by decrementing the pre-transcoding amount of data in the particular video frame by a pre-transcoding amount of data in the first portion.

9. The method of claim 1, comprising the further step of:

maintaining a running count of an amount of data used in transcoding the portions;

wherein, if the running count exceeds a maximum level, a panic quantization scale is set until there are enough bits left for the macroblocks in the remaining portions to receive a minimum number of bits for transcoding thereof.

10. The method of claim 9, wherein:

the maximum level is adjusted downwards after transcoding of each portion.

11. The method of claim 1, wherein:

each macroblock has its own associated old quantization scale.

12. The method of claim 1, wherein:

a group of the macroblocks has its own associated old quantization scale.

13. A statistical remultiplexer that receives a plurality of channels comprising encoded video frames, including a particular video frame that comprises a plurality of macroblocks in associated portions of the particular video frame, each macroblock having an associated old quantization scale when the particular video frame is input to the statistical multiplexer, comprising:

means for computing a target amount of data that is expected to result from transcoding the particular video frame; and means for determining new quantization scales for use in transcoding corresponding macroblocks in a first portion of the particular video frame in accordance with (a) the corresponding old quantization scales, and a ratio of (b) a pre-transcoding amount of data in the particular video frame to (c) the target amount of data.

* * * * *